(12) United States Patent
Lee et al.

(10) Patent No.: US 9,145,952 B2
(45) Date of Patent: Sep. 29, 2015

(54) POWER TRANSMITTING APPARATUS FOR VEHICLE

(71) Applicant: Hyundai Motor Company, Seoul (KR)

(72) Inventors: Sueng Ho Lee, Seoul (KR); Jongsool Park, Hwaseong-si (KR); Kyeonghun Lee, Seoul (KR); Choung Wan Son, Seoul (KR); Chang Yeon Cho, Seoul (KR); Jong Min Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/144,295

(22) Filed: Dec. 30, 2013

(65) Prior Publication Data
US 2015/0096393 A1 Apr. 9, 2015

(30) Foreign Application Priority Data
Oct. 7, 2013 (KR) .................. 10-2013-0119320

(51) Int. Cl.
*F16H 3/08* (2006.01)
*F16H 3/12* (2006.01)

(52) U.S. Cl.
CPC .................................. *F16H 3/12* (2013.01)

(58) Field of Classification Search
USPC .................. 74/330, 331, 333, 340
See application file for complete search history.

(56) References Cited

U.S. PATENT DOCUMENTS

| 3,589,483 | A  * | 6/1971 | Smith ................... 192/3.52 |
| 6,874,381 | B2 * | 4/2005 | Berger et al. ............. 74/335 |
| 7,340,973 | B2 * | 3/2008 | Hiraiwa ................... 74/330 |
| 7,383,749 | B2 * | 6/2008 | Schafer et al. ........... 74/340 |
| 2006/0266141 | A1 * | 11/2006 | Ogami ................... 74/325 |
| 2007/0199393 | A1 * | 8/2007 | Hattori .................. 74/331 |
| 2007/0266810 | A1 * | 11/2007 | Forsyth ................. 74/331 |
| 2008/0202266 | A1 * | 8/2008 | Hendrickson et al. ..... 74/331 |

FOREIGN PATENT DOCUMENTS

JP 11-51125 A 2/1999

* cited by examiner

*Primary Examiner* — Ha D Ho
(74) *Attorney, Agent, or Firm* — Morgan, Lewis & Bockius LLP

(57) ABSTRACT

A power transmitting apparatus may selectively transmit torque of power source to two input shafts through two clutches and may output changed torque through two output shafts after the torque selectively transmitted to the two input shafts is changed. The two input shafts may respectively have a plurality of input gears fixed thereon, the two output shafts may respectively have a plurality of speed gears rotatable on the output shafts and a plurality of synchronizers operably connecting each speed gear to any one of the output shafts, and each input gear may be engaged with at least one speed gear.

19 Claims, 18 Drawing Sheets

FIG. 5

| Speed | CL1 | CL2 | SL1 | | | SL2 | | | SL3 | | | SL4 | | SL5 | |
|---|---|---|---|---|---|---|---|---|---|---|---|---|---|---|---|
| | | | D1 | N | D5 | D2 | N | D4 | D3 | N | D7 | D6 | N | R1 | N |
| Rev1 | △ | | | ○ | | ● | | | | ○ | | | ○ | ● | |
| N | | | | ○ | | | ○ | | | ○ | | | ○ | | ○ |
| 1st | △ | | ● | | | | ○ | | | ○ | | | ○ | | ○ |
| 2nd | | △ | | ○ | | ● | | | | ○ | | | ○ | | ○ |
| 3rd | △ | | | ○ | | | ○ | | ● | | | | ○ | | ○ |
| 4th | | △ | | ○ | | | | ● | | ○ | | | ○ | | ○ |
| 5th | △ | | | | ● | | ○ | | | ○ | | | ○ | | ○ |
| 6th | | △ | | ○ | | | ○ | | | ○ | | ● | | | ○ |
| 7th | △ | | | ○ | | | ○ | | | | ● | | ○ | | ○ |

△ : clutch engage    ● : operating position    ○ : neutral position

FIG. 9

| Speed | CL1 | CL2 | SL1 | | | SL2 | | | SL3 | | | SL4 | | SL5 | |
|---|---|---|---|---|---|---|---|---|---|---|---|---|---|---|---|
| | | | D1 | N | D5 | D2 | N | D4 | D3 | N | D7 | D6 | N | R1 | N |
| Rev1 | △ | | ○ | | | ○ | | | ○ | | | ● | | ● | |
| N | | | ○ | | | ○ | | | ○ | | | | ○ | | ○ |
| 1st | △ | | ● | | | ○ | | | ○ | | | | ○ | | ○ |
| 2nd | | △ | ○ | | | ● | | | ○ | | | | ○ | | ○ |
| 3rd | △ | | ○ | | | ○ | | ● | | | | | ○ | | ○ |
| 4th | | △ | ○ | | | | ● | | ○ | | | | ○ | | ○ |
| 5th | △ | | | ● | | ○ | | | ○ | | | | ○ | | ○ |
| 6th | | △ | ○ | | | ○ | | | ○ | | | ● | | | ○ |
| 7th | △ | | ○ | | | ○ | | | | | ● | | ○ | | ○ |

△ : clutch engage    ● : operating position    ○ : neutral position

FIG. 13

| Speed | CL1 | CL2 | SL1 | | | SL2 | | SL3 | | | SL4 | | | SL5 | |
|---|---|---|---|---|---|---|---|---|---|---|---|---|---|---|---|
| | | | D1 | N | D5 | D2 | N | D3 | N | D7 | D4 | N | D6 | R1 | N |
| Rev1 | | △ | ● | | | | ○ | ○ | | | | ○ | | ● | |
| N | | | | ○ | | | ○ | | ○ | | | ○ | | | ○ |
| 1st | △ | | ● | | | | ○ | | ○ | | | ○ | | | ○ |
| 2nd | | △ | ○ | | | ● | | | ○ | | | ○ | | | ○ |
| 3rd | △ | | ○ | | | | ○ | ● | | | | ○ | | | ○ |
| 4th | | △ | ○ | | | | ○ | | ○ | | ● | | | | ○ |
| 5th | △ | | | | ● | | ○ | | ○ | | | ○ | | | ○ |
| 6th | | △ | ○ | | | | ○ | | ○ | | | | ● | | ○ |
| 7th | △ | | ○ | | | | ○ | | | ● | | ○ | | | ○ |

△ : clutch engage　　● : operating position　　○ : neutral position

FIG. 17

| Speed | CL1 | CL2 | SL1 | | | SL2 | | | SL3 | | | SL4 | | SL5 | |
|---|---|---|---|---|---|---|---|---|---|---|---|---|---|---|---|
| | | | D1 | N | D5 | D2 | N | D4 | D3 | N | D7 | D6 | N | R1 | N |
| Rev1 | | △ | | ○ | | | ○ | | ● | | | | ○ | ● | |
| N | | | | ○ | | | ○ | | | ○ | | | ○ | | ○ |
| 1st | △ | | ● | | | | ○ | | | ○ | | | ○ | | ○ |
| 2nd | | △ | | ○ | | ● | | | | ○ | | | ○ | | ○ |
| 3rd | △ | | | ○ | | | ○ | | ● | | | | ○ | | ○ |
| 4th | | △ | | ○ | | | | ● | | ○ | | | ○ | | ○ |
| 5th | △ | | | | ● | | ○ | | | ○ | | | ○ | | ○ |
| 6th | | △ | | ○ | | | ○ | | | ○ | | ● | | | ○ |
| 7th | △ | | | ○ | | | ○ | | | | ● | | ○ | | ○ |

△ : clutch engage    ● : operating position    ○ : neutral position

POWER TRANSMITTING APPARATUS FOR VEHICLE

CROSS-REFERENCE TO RELATED APPLICATION

The present application claims priority to Korean Patent Application No. 10-2013-0119320 filed on Oct. 7, 2013, the entire contents of which is incorporated herein for all purposes by this reference.

BACKGROUND OF THE INVENTION

1. Field of the Invention

The present invention relates to a power transmitting apparatus for a vehicle to which double clutches are applied. More particularly, the present invention relates to a power transmitting apparatus for a vehicle which minimizes a length thereof by disposing a synchronizer for reverse speeds on an additional idle shaft.

2. Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

The DCT includes two clutch devices and a gear train applied to a manual transmission. The DCT selectively transmits torque input from an engine to two input shafts by using two clutches, changes a speed by using the gear train, and outputs the changed torque.

Such the DCT is used to realize a compact transmission having more than five forward speeds. Since two clutches and synchronizing devices are controlled by a controller according to the DCT, manual shift maneuver is unnecessary for controlling the DCT. Therefore, the DCT is one type of automated manual transmissions (AMT).

The DCT, compared with an automatic transmission using planetary gear sets, has excellent power delivery efficiency and change and addition of components is very easy in the DCT. Therefore, the DCT can meet fuel consumption regulations and multi-speeds efficiency may be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmitting apparatus for a vehicle having advantages of minimizing a length of the power transmitting apparatus, an input shaft, and an output shaft and improving mountability by disposing a synchronizer for a reverse speed on an additional shaft, and reducing weight by minimizing the number of gears that is involved in the reverse speeds.

A power transmitting apparatus for a vehicle according to an exemplary embodiment of the present invention may selectively transmit torque of power source to two input shafts through two clutches and may output changed torque through two output shafts after the torque selectively transmitted to the two input shafts is changed.

The two input shafts may respectively have a plurality of input gears fixed thereon, the two output shafts may respectively have a plurality of speed gears rotatable on the output shafts and a plurality of synchronizers operably connecting each speed gear to any one of the output shafts, and each input gear may be engaged with at least one speed gear.

One input gear on one input shaft of the two input shafts may be engaged with a reverse input gear on a reverse idle shaft disposed in parallel with the corresponding input shaft, and a reverse output gear on the reverse idle shaft may be engaged with one speed gear on one output shaft of the two output shafts.

At least one of the reverse input gear and the reverse output gear may be rotatable about the reverse idle shaft and may be operably connected to the reverse idle shaft by at least one synchronizer disposed on the reverse idle shaft.

The two input shafts may include a first input shaft selectively receiving the torque of the power source through a first clutch, and a second input shaft being a hollow shaft in which the first input shaft is inserted without rotational interference with the second input shaft and receiving the torque of the power source through a second clutch, and the two output shafts may include first and second output shafts disposed in parallel with the first and second input shafts.

The first input shaft may be provided with first, second, third, and fourth input gears and the second input shaft is provided with fifth and sixth input gears, wherein the first output shaft is provided with a first speed gear engaged with the second input gear, a fifth speed gear engaged with the fourth input gear, a second speed gear engaged with the fifth input gear, and a fourth speed gear engaged with the sixth input gear, wherein the second output shaft is provided with a third speed gear engaged with the third input gear, a seventh speed gear engaged with the first input gear, and a sixth speed gear engaged with the sixth input gear, and wherein the plurality of synchronizers include a first synchronizer operably connecting the first speed gear or the fifth speed gear to the first output shaft, a second synchronizer operably connecting the second speed gear or the fourth speed gear to the first output shaft, a third synchronizer operably connecting the third speed gear or the seventh speed gear to the second output shaft, and a fourth synchronizer operably connecting the sixth speed gear to the second output shaft.

The reverse input gear may be engaged with the first input gear on the first input shaft and the reverse output gear may be engaged with the second speed gear on the first output shaft.

The reverse input gear may be rotatable about the reverse idle shaft and the reverse output gear may be fixed to the reverse idle shaft.

The reverse input gear may be fixed to the reverse idle shaft and the reverse output gear may be rotatable about the reverse idle shaft.

The reverse input gear and the reverse output gear may be rotatable about the reverse idle shaft.

The reverse input gear may be engaged with the second input gear on the first input shaft and the reverse output gear may be engaged with the sixth speed gear on the second output shaft.

The reverse input gear may be rotatable about the reverse idle shaft and the reverse output gear may be fixed to the reverse idle shaft.

The first input shaft may be provided with first, second, third, and fourth input gears and the second input shaft may be provided with fifth and sixth input gears, wherein the first output shaft is provided with a first speed gear engaged with the second input gear, a fifth speed gear engaged with the fourth input gear, and a second speed gear engaged with the sixth input gear, wherein the second output shaft is provided with a third speed gear engaged with the third input gear, a seventh speed gear engaged with the first input gear, a fourth speed gear engaged with the sixth input gear, and a sixth speed gear engaged with the fifth input gear, and wherein the plurality of synchronizers include a first synchronizer operably connecting the first speed gear or the fifth speed gear to the first output shaft, a second synchronizer operably connecting the second speed gear to the first output shaft, a third synchronizer operably connecting the third speed gear or the seventh speed gear to the second output shaft, and a fourth synchronizer operably connecting the fourth speed gear or the sixth speed gear to the second output shaft.

The reverse input gear may be engaged with the fifth input gear on the second input shaft and the reverse output gear may be engaged with the first speed gear on the first output shaft.

The reverse input gear may be rotatable about the reverse idle shaft and the reverse output gear may be fixed to the reverse idle shaft.

The first input shaft may be provide with first, second, and third input gears and the second input shaft may be provided with fourth, fifth, and sixth input gears, wherein the first output shaft is provided with a first speed gear engaged with the second input gear, a fifth speed gear engaged with the third input gear, a fourth speed gear engaged with the sixth input gear, and a second speed gear engaged with the fourth input gear, wherein the second output shaft is provided with a third speed gear engaged with the third input gear, a seventh speed gear engaged with the first input gear, and a sixth speed gear engaged with the fifth input gear, and wherein the plurality of synchronizers include a first synchronizer operably connecting the first speed gear or the fifth speed gear to the first output shaft, a second synchronizer operably connecting the second speed gear or the fourth speed gear to the first output shaft, a third synchronizer operably connecting the third speed gear or the seventh speed gear to the second output shaft, and a fourth synchronizer operably connecting the sixth speed gear to the second output shaft.

The reverse input gear may be engaged with the fourth input gear on the second input shaft and the reverse output gear may be engaged with the third speed gear on the second output shaft.

The reverse input gear may be rotatable about the reverse idle shaft and the reverse output gear may be fixed to the reverse idle shaft.

A power transmitting apparatus for a vehicle according to another exemplary embodiment of the present invention may include, a first clutch connected to a power source and selectively outputting torque of the power source. a second clutch connected to the power source and selectively outputting the torque of the power source. a first input shaft selectively receiving the torque of the power source through the first clutch and provided with first, second, third, and fourth input gears disposed on an exterior circumference thereof a second input shaft disposed on the same axis as the first input shaft without rotational interference, selectively receiving the torque of the power source through the second clutch, and provided with fifth and sixth input gears disposed on an exterior circumference thereof first and second output shafts disposed in parallel with the first and second input shafts. a reverse speed device including a reverse idle shaft disposed in parallel with the first and second output shafts, a reverse input gear rotatable about the reverse idle shaft, and a reverse output gear fixed to the reverse idle shaft. a first speed gear disposed on the first output shaft, selectively connected to the first output shaft through a first synchronizer, and engaged with the second input gear. a fifth speed gear disposed on the first output shaft, selectively connected to the first output shaft through the first synchronizer, and engaged with the fourth input gear. a second speed gear disposed on the first output shaft, selectively connected to the first output shaft through a second synchronizer, and engaged with the fifth input gear. a fourth speed gear disposed on the first output shaft, selectively connected to the first output shaft through the second synchronizer, and engaged with the sixth input gear. a third speed gear disposed on the second output shaft, selectively connected to the second output shaft through a third synchronizer, and engaged with the third input gear. a seventh speed gear disposed on the second output shaft, selectively connected to the second output shaft through the third synchronizer, and engaged with the first input gear. a sixth speed gear disposed on the second output shaft, selectively connected to the second output shaft through a fourth synchronizer, and engaged with the sixth input gear, wherein the reverse input gear is engaged with the first input gear and is selectively connected to the reverse idle shaft through a fifth synchronizer, and the reverse output gear is engaged with the second speed gear.

A power transmitting apparatus for a vehicle according to other exemplary embodiment of the present invention may include, a first clutch connected to a power source and selectively outputting torque of the power source. a second clutch connected to the power source and selectively outputting the torque of the power source. a first input shaft selectively receiving the torque of the power source through the first clutch and provided with first, second, third, and fourth input gears disposed on an exterior circumference thereof a second input shaft disposed on the same axis as the first input shaft without rotational interference, selectively receiving the torque of the power source through the second clutch, and provided with fifth and sixth input gears disposed on an exterior circumference thereof first and second output shafts disposed in parallel with the first and second input shafts. a reverse speed device including a reverse idle shaft disposed in parallel with the first and second output shafts, a reverse input gear rotatable about the reverse idle shaft, and a reverse output gear fixed to the reverse idle shaft. a first speed gear disposed on the first output shaft, selectively connected to the first output shaft through a first synchronizer, and engaged with the second input gear. a fifth speed gear disposed on the first output shaft, selectively connected to the first output shaft through the first synchronizer, and engaged with the fourth input gear. a second speed gear disposed on the first output shaft, selectively connected to the first output shaft through a second synchronizer, and engaged with the fifth input gear. a fourth speed gear disposed on the first output shaft, selectively connected to the first output shaft through the second synchronizer, and engaged with the sixth input gear. a third speed gear disposed on the second output shaft, selectively connected to the second output shaft through a third synchronizer, and engaged with the third input gear. a seventh speed gear disposed on the second output shaft, selectively connected to the second output shaft through the third synchronizer, and engaged with the first input gear. a sixth speed gear disposed on the second output shaft, selectively connected to the second output shaft through a fourth synchronizer, and engaged with the sixth input gear, wherein the reverse input gear is engaged with the second input gear and is selectively connected to the reverse idle shaft through a fifth synchronizer, and the reverse output gear is engaged with the sixth speed gear.

A power transmitting apparatus for a vehicle according to other exemplary embodiment of the present invention may include, a first clutch connected to a power source and selectively outputting torque of the power source. a second clutch connected to the power source and selectively outputting the torque of the power source. a first input shaft selectively receiving the torque of the power source through the first clutch and provided with first, second, third, and fourth input gears disposed on an exterior circumference thereof a second input shaft disposed on the same axis as the first input shaft without rotational interference, selectively receiving the torque of the power source through the second clutch, and provided with fifth and sixth input gears disposed on an exterior circumference thereof first and second output shafts disposed in parallel with the first and second input shafts. a reverse speed device including a reverse idle shaft disposed in parallel with the first and second output shafts, a reverse input gear rotatable about the reverse idle shaft, and a reverse output gear fixed to the reverse idle shaft. a first speed gear disposed on the first output shaft, selectively connected to the first output shaft through a first synchronizer, and engaged with the second input gear. a fifth speed gear disposed on the first output shaft, selectively connected to the first output shaft through the first synchronizer, and engaged with the fourth input gear. a second speed gear disposed on the first output shaft, selectively connected to the first output shaft through a second synchronizer, and engaged with the sixth input gear. a third speed gear disposed on the second output shaft, selectively connected to the second output shaft through a third synchronizer, and engaged with the third input gear. a seventh speed gear disposed on the second output shaft, selectively connected to the second output shaft through the third synchronizer, and engaged with the first input gear. a fourth speed gear disposed on the second output shaft, selectively connected to the second output shaft through a fourth synchronizer, and engaged with the sixth input gear. a sixth speed gear disposed on the second output shaft, selectively connected to the second output shaft through the fourth synchronizer, and engaged with the fifth input gear, wherein the reverse input gear is engaged with the fifth input gear and is selectively connected to the reverse idle shaft through a fifth synchronizer, and the reverse output gear is engaged with the first speed gear.

A power transmitting apparatus for a vehicle according to other exemplary embodiment of the present invention may include, a first clutch connected to a power source and selectively outputting torque of the power source. a second clutch connected to the power source and selectively outputting the torque of the power source. a first input shaft selectively receiving the torque of the power source through the first clutch and provided with first, second, and third input gears disposed on an exterior circumference thereof. a second input shaft disposed on the same axis as the first input shaft without rotational interference, selectively receiving the torque of the power source through the second clutch, and provided with fourth, fifth, and sixth input gears disposed on an exterior circumference thereof first and second output shafts disposed in parallel with the first and second input shafts. a reverse speed device including a reverse idle shaft disposed in parallel with the first and second output shafts, a reverse input gear rotatable about the reverse idle shaft, and a reverse output gear fixed to the reverse idle shaft. a first speed gear disposed on the first output shaft, selectively connected to the first output shaft through a first synchronizer, and engaged with the second input gear. a fifth speed gear disposed on the first output shaft, selectively connected to the first output shaft through the first synchronizer, and engaged with the third input gear. a second speed gear disposed on the first output shaft, selectively connected to the first output shaft through a second synchronizer, and engaged with the fourth input gear. a fourth speed gear disposed on the first output shaft, selectively connected to the first output shaft through the second synchronizer, and engaged with the sixth input gear. a third speed gear disposed on the second output shaft, selectively connected to the second output shaft through a third synchronizer, and engaged with the third input gear. a seventh speed gear disposed on the second output shaft, selectively connected to the second output shaft through the third synchronizer, and engaged with the first input gear. a sixth speed gear disposed on the second output shaft, selectively connected to the second output shaft through a fourth synchronizer, and engaged with the fifth input gear, wherein the reverse input gear is engaged with the fourth input gear and is selectively connected to the reverse idle shaft through a fifth synchronizer, and the reverse output gear is engaged with the third speed gear.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is an operational chart of a power transmitting apparatus for a vehicle according to the various exemplary embodiments of the present invention.

FIG. 9 is an operational chart of a power transmitting apparatus for a vehicle according to the various exemplary embodiments of the present invention.

FIG. 13 is an operational chart of a power transmitting apparatus for a vehicle according to the various exemplary embodiments of the present invention.

FIG. 17 is an operational chart of a power transmitting apparatus for a vehicle according to the various exemplary embodiments of the present invention.

Figure 1:
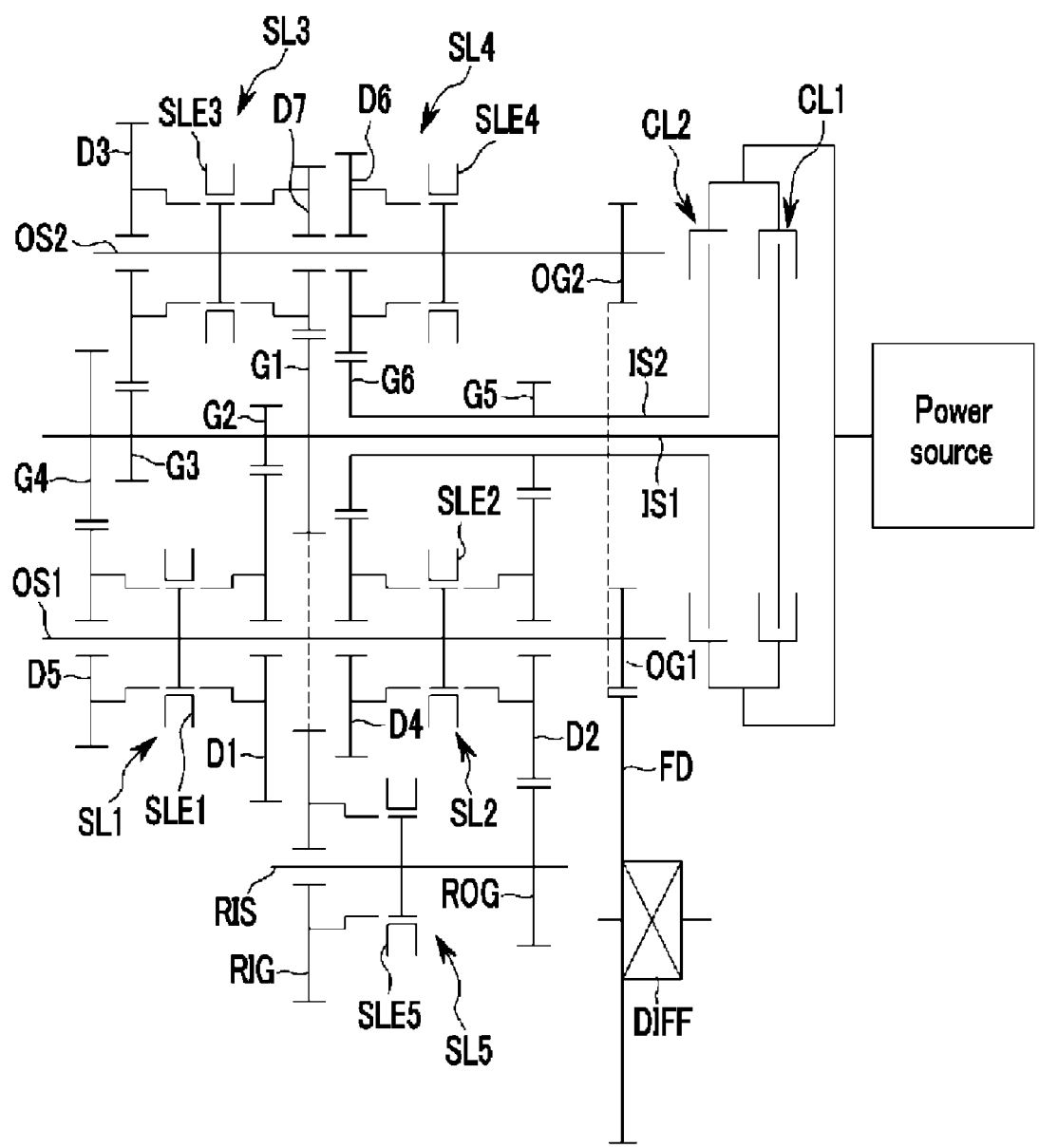
FIG. 1 is a schematic diagram of a power transmitting apparatus for a vehicle according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmitting apparatus for a vehicle according to the first exemplary embodiment of the present invention.

Referring to FIG. 1, a power transmitting apparatus according to the first exemplary embodiment of the present invention includes a variable connecting device provided with first and second clutches CL1 and CL2 and selectively transmitting torque of a power source (e.g., engine or motor), an input device provided with first and second input shafts IS1 and IS2, and a speed output device and a reverse speed device changing the torque received through the input device according to each shift-speed and outputting the changed torque.

The power source may be an engine in a vehicle provided with a manual transmission or an automatic transmission using a typical internal combustion engine and may be a motor in a hybrid electric vehicle including an electric vehicle driven by the motor.

The first and second clutches CL1 and CL2 included in the variable connecting device selectively transmits torque of the power source to the first and second input shafts IS1 and IS2.

The first clutch C1 selectively transmits the torque of the power source to the first input shaft IS1 and the second clutch CL2 selectively transmits the torque of the power source to the second input shaft IS2.

The first and second clutches CL1 and CL2 included in the variable connecting device may be typical multi-plates clutches of wet type, but are not limited thereto. The first and second clutches CL1 and CL2 may be multi-plates clutches of dry type. The first and second clutches CL1 and CL2 may be controlled by a hydraulic control system.

The input device includes the first input shaft IS1 selectively connected to an output side of the power source through the first clutch CL1 and the second input shaft IS2 selectively connected to the output side of the power source through the second clutch CL2. The second input shaft IS2 is a hollow shaft, and the first input shaft IS1 is inserted in the second input shaft IS2 without rotational interference with the second input shaft IS2.

First, second, third, and fourth input gears G1, G2, G3, and G4 are disposed at an exterior circumference of the first input shaft IS1 with predetermined distances. The first, second, third, and fourth input gear G1, G2, G3, and G4 are positioned at a rear portion of the first input shaft IS1 penetrating the second input shaft IS2 and are disposed in a sequence of the first, second, third, and fourth input gears G1, G2, G3, and G4.

Fifth and sixth input gears G5 and G6 are disposed on the second input shaft IS2 with a predetermined distance. The fifth input gear G5 is disposed at a front portion of the second input shaft IS2 and the sixth input gear G6 is disposed at a rear portion of the second input shaft IS2.

Therefore, the first, second, third, and fourth input gears G1, G2, G3, and G4 as well as the first input shaft IS1 are rotated when the first clutch CL1 is operated, and the fifth and sixth input gears G5 and G6 as well as the second input shaft IS2 are rotated when the second clutch CL2 is operated.

The first, second, third, fourth, fifth, and sixth input gears G1, G2, G3, G4, G5, and G6 are input gears operating at each speed. The first input gear G1 is operated at a seventh forward speed and a reverse speed, the second input gear G2 is operated at a first forward speed, the third input gear G3 is operated at a third forward speed, and the fourth input gear G4 is operated at a fifth forward speed.

In addition, the fifth input gear G5 is operated at a second forward speed and the sixth input gear G6 is operated at a fourth forward speed and a sixth forward speed.

That is, the input gears G1, G2, G3, and G4 for odd-numbered speeds and the reverse speed are disposed on the first input shaft IS1, and the input gears G5 and G6 for even-numbered speeds are disposed on the second input shaft IS2.

In addition, the speed output device includes first and second output shafts OS1 and OS2 disposed in parallel with the first and second input shafts IS1 and IS2.

A first speed gear D1 and a fifth speed gear D5 are disposed on the first output shaft OS1, and a first synchronizer SL1 operably connecting the first speed gear D1 or the fifth speed gear D5 to the first output shaft OS1 is disposed on the first output shaft OS1 between the first speed gear D1 and the fifth speed gear D5. In addition, a second speed gear D2 and a fourth speed gear D4 are disposed on the first output shaft OS1, and a second synchronizer SL2 operably connecting the second speed gear D2 or the fourth speed gear D4 to the first output shaft OS1 is disposed on the first output shaft OS1 between the second speed gear D2 and the fourth speed gear D4. Further, a first output gear OG1 is disposed at a front portion of the first output shaft OS1.

The first synchronizer SL1 is disposed at a rear portion of the first output shaft OS1 and the second synchronizer SL2 is disposed at the front portion of the first output shaft OS1.

The first speed gear D1 is engaged with the second input gear G2 and the fifth speed gear D5 is engaged with the fourth input gear G4.

The second speed gear D2 is engaged with the fifth input gear G5 and the fourth speed gear D4 is engaged with the sixth input gear G6.

In addition, the first output gear OG1 outputs torque transmitted from the first output shaft OS1 to a differential device DIFF through a final reduction gear FD.

In addition, a third speed gear D3 and a seventh speed gear D7 are disposed on the second output shaft OS2, and a third synchronizer SL3 operably connecting the third gear D3 or the seventh speed gear D7 to the second output shaft OS2 is disposed on the second output shaft OS2 between the third speed gear D3 and the seventh speed gear D7. In addition, a sixth speed gear D6 and a fourth synchronizer SL4 operably connecting the sixth speed gear D6 to the second output shaft OS2 are disposed on the second output shaft OS2. Further, a second output gear OG2 is disposed on a front portion of the second output shaft OS2.

The third synchronizer SL3 is disposed at a rear portion of the second output shaft OS2 and the fourth synchronizer SL4 is disposed at a front portion of the second output shaft OS2.

The third speed gear D3 is engaged with the third input gear G3 and the seventh speed gear D7 is engaged with the first input gear G1.

The sixth speed gear D6 is engaged with the sixth input gear G6.

In addition, the second output gear OG2 outputs torque transmitted from the second output shaft OS2 to the differential device DIFF through the final reduction gear FD.

Herein, the first output gear OG1 and the second output gear OG2 are engaged with the final reduction gear FD so as to finally change the torque of the first output shaft OS1 or the second output shaft OS2 and transmit the changed torque to a driving wheel through the differential device DIFF.

Meanwhile, the reverse speed device includes a reverse idle shaft RIS disposed in parallel with the first output shaft OS1.

A reverse input gear RIG and a reverse output gear ROG are disposed on the reverse idle shaft RIS. The reverse input gear RIG is rotatable about the reverse idle shaft RIS and the reverse output gear ROG is fixed to the reverse idle shaft RIS.

In addition, a fifth synchronizer SL5 operably connecting the reverse input gear RIG to the reverse idle shaft RIS is disposed on the reverse idle shaft RIS.

At this time, the reverse input gear RIG is engaged with the first input gear G1 and the reverse output gear ROG is engaged with the second speed gear D2.

Herein, a synchronizer means a device which operably connects two members which can rotate relatively and may include a synchromesh, a dog clutch, a clutch and so on. Since the first, second, third, fourth, and fifth synchronizer modules SL1, SL2, SL3, SL4, and SL5 are well known to a person of an ordinary skill in the art, detailed description thereof will be omitted. Sleeves SLE1, SLE2, SLE3, SLE4, and SLE5 applied respectively to the first, second, third, fourth, and fifth synchronizer modules SL1, SL2, SL3, SL4, and SL5, as well known to a person of an ordinary skill in the art, are operated by additional actuators and the actuators are controlled by a transmission control unit.

Figure 2:
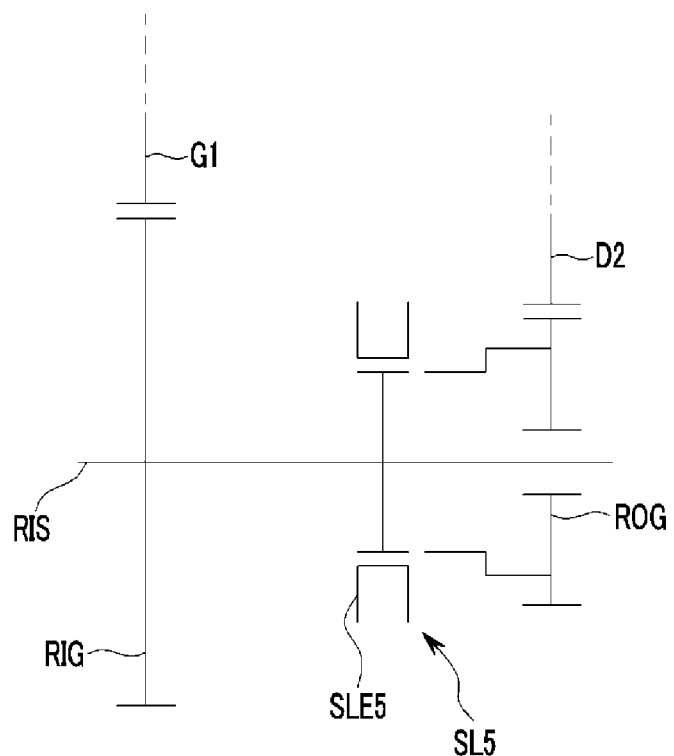
FIG. 2 is a drawing of another example of a reverse speed device in a power transmitting apparatus for a vehicle according to the various exemplary embodiments of the present invention.

FIG. 2 is a drawing of another example of a reverse speed device in a power transmitting apparatus for a vehicle according to the first exemplary embodiment of the present invention.

As shown in FIG. 2, another example of the reverse speed device includes the reverse idle shaft RIS disposed in parallel with the first output shaft OS1.

The reverse input gear RIG and the reverse output gear ROG are disposed on the reverse idle shaft RIS. The reverse input gear RIG is fixed to the reverse idle shaft RIS and the reverse output gear ROG is rotatable about the reverse idle shaft RIS.

In addition, the fifth synchronizer SL5 operably connecting the reverse output gear ROG with the reverse idle shaft RIS is disposed on the reverse idle shaft RIS.

At this time, the reverse input gear RIG is engaged with the first input gear G1 and the reverse output gear ROG is engaged with the second speed gear D2.

Figure 3:
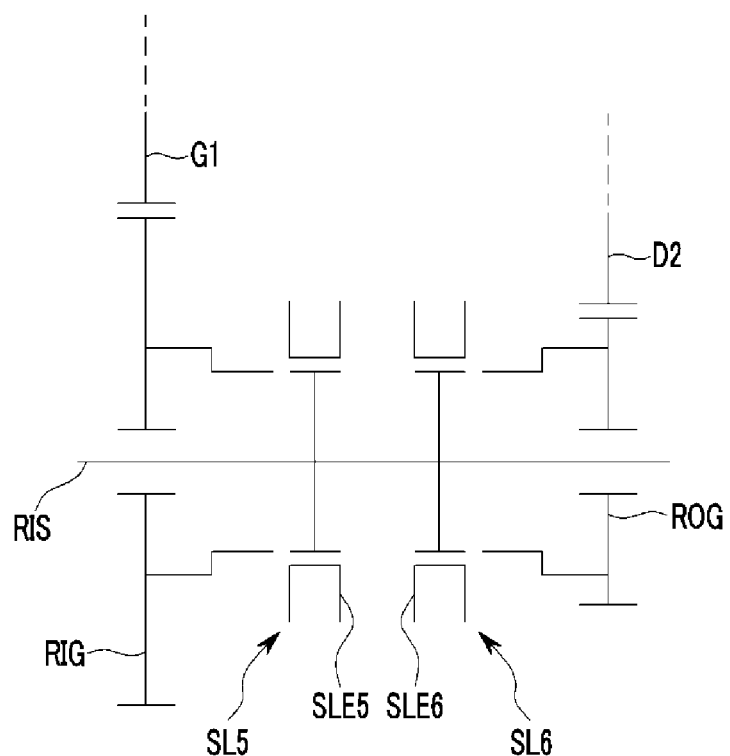
FIG. 3 is a drawing of other example of a reverse speed device in a power transmitting apparatus for a vehicle according to the various exemplary embodiments of the present invention.

FIG. 3 is a drawing of other example of a reverse speed device in a power transmitting apparatus for a vehicle according to the first exemplary embodiment of the present invention.

As shown in FIG. 3, other example of the reverse speed device includes the reverse idle shaft RIS disposed in parallel with the first output shaft OS1.

The reverse input gear RIG and the reverse output gear ROG are disposed on the reverse idle shaft RIS. Both of the reverse input gear RIG and the reverse output gear ROG are rotatable about the reverse idle shaft RIS.

In addition, the fifth synchronizer SL5 and a sixth synchronizer SL6 operably connecting the reverse input gear RIG and the reverse output gear ROG to the reverse idle shaft RIS are disposed on the reverse idle shaft RIS.

At this time, the reverse input gear RIG is engaged with the first input gear G1 and the reverse output gear ROG is engaged with the second speed gear D2.

Figure 4:
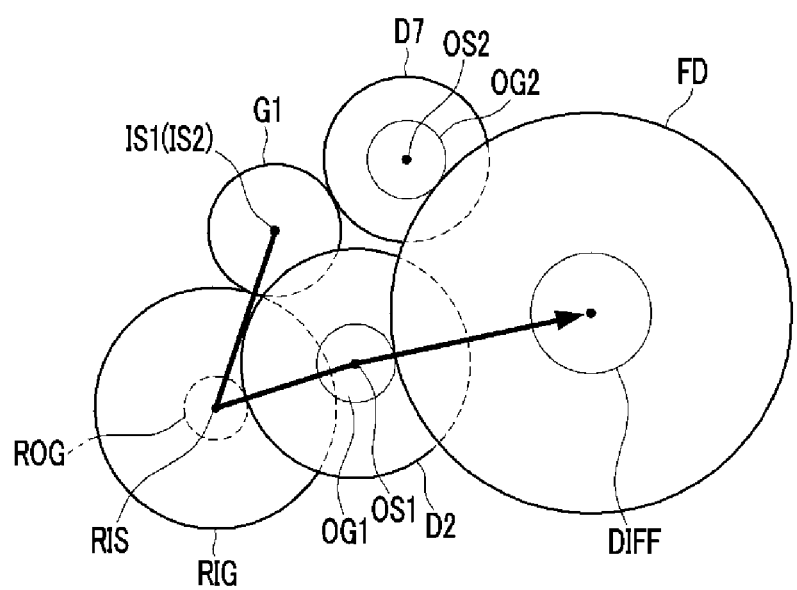
FIG. 4 is an axial plan view of a power transmitting apparatus for a vehicle according to the various exemplary embodiments of the present invention.

FIG. 4 is an axial plan view of a power transmitting apparatus for a vehicle according to the first exemplary embodiment of the present invention.

Referring to FIG. 4, the first input shaft IS1 as well as the second input shaft IS2, the first and second output shafts OS1 and OS2, the reverse idle shaft RIS, and the differential device DIFF are disposed in parallel with each other.

In addition, the first input gear G1 on the first input shaft IS1 is engaged with the seventh speed gear D7 and the reverse input gear RIG.

The reverse output gear ROG on the reverse idle shaft RIS is engaged with the second speed gear D2 on the first output shaft OS1.

In addition, first and second output gears OG1 and OG2 on the first and second output shafts OS1 and OS2 are engaged with the final reduction gear FD of the differential device DIFF.

FIG. 5 is an operational chart of a power transmitting apparatus for a vehicle according to the first exemplary embodiment of the present invention.

[First Forward Speed]

At the first forward speed 1st, the first speed gear D1 and the first output shaft OS1 are operably connected through the sleeve SEL1 of the first synchronizer SL1. After that, the first clutch CL1 is operated. Then, shift to the first forward speed is completed.

[Second Forward Speed]

If vehicle speed increases at the first forward speed 1st and shift to the second forward speed 2nd is necessary, the second speed gear D2 and the first output shaft OS1 are operably connected through the sleeve SEL2 of the second synchronizer SL2. After that, the first clutch CL1 is released and the second clutch CL2 is operated. Then, the shift to the second forward speed is completed.

After the shift to the second forward speed is completed, the sleeve SEL1 of the first synchronizer SL1 is moved to a neutral position.

[Third Forward Speed]

If the vehicle speed increases at the second forward speed 2nd and shift to the third forward speed 3rd is necessary, the third speed gear D3 and the second output shaft OS2 are operably connected through the sleeve SEL3 of the third synchronizer SL3. After that, the second clutch CL2 is released and the first clutch CL1 is operated. Then, the shift to the third forward speed is completed.

After the shift to the third forward speed is completed, the sleeve SEL2 of the second synchronizer SL2 is moved to a neutral position.

[Fourth Forward Speed]

If the vehicle speed increases at the third forward speed 3rd and shift to the fourth forward speed 4th is necessary, the fourth speed gear D4 and the first output shaft OS1 are operably connected through the sleeve SEL2 of the second synchronizer SL2. After that, the first clutch CL1 is released and the second clutch CL2 is operated. Then, the shift to the fourth forward speed is completed.

After the shift to the fourth forward speed is completed, the sleeve SEL3 of the third synchronizer SL3 is moved to a neutral position.

[Fifth Forward Speed]

If the vehicle speed increases at the fourth forward speed 4th and shift to the fifth forward speed 5th is necessary, the fifth speed gear D5 and the first output shaft OS1 are operably connected through the sleeve SEL1 of the first synchronizer SL1. After that, the second clutch CL2 is released and the first clutch CL1 is operated. Then, the shift to the fifth forward speed is completed.

After the shift to the fifth forward speed is completed, the sleeve SEL2 of the second synchronizer SL2 is moved to a neutral position.

[Sixth Forward Speed]

If the vehicle speed increases at the fifth forward speed 5th and shift to the sixth forward speed 6th is necessary, the sixth speed gear D6 and the second output shaft OS2 are operably connected through the sleeve SEL4 of the fourth synchronizer SL4. After that, the first clutch CL1 is released and the second clutch CL2 is operated. Then, the shift to the sixth forward speed is completed.

After the shift to the sixth forward speed is completed, the sleeve SEL1 of the first synchronizer SL1 is moved to a neutral position.

[Seventh Forward Speed]

If the vehicle speed increases at the sixth forward speed 6th and shift to the seventh forward speed 7th is necessary, the seventh speed gear D7 and the second output shaft OS2 are operably connected through the sleeve SEL3 of the third synchronizer SL3. After that, the second clutch CL2 is released and the first clutch CL1 is operated. Then, the shift to the seventh forward speed is completed.

After the shift to the seventh forward speed is completed, the sleeve SEL4 of the fourth synchronizer SL4 is moved to a neutral position.

Figure 6:
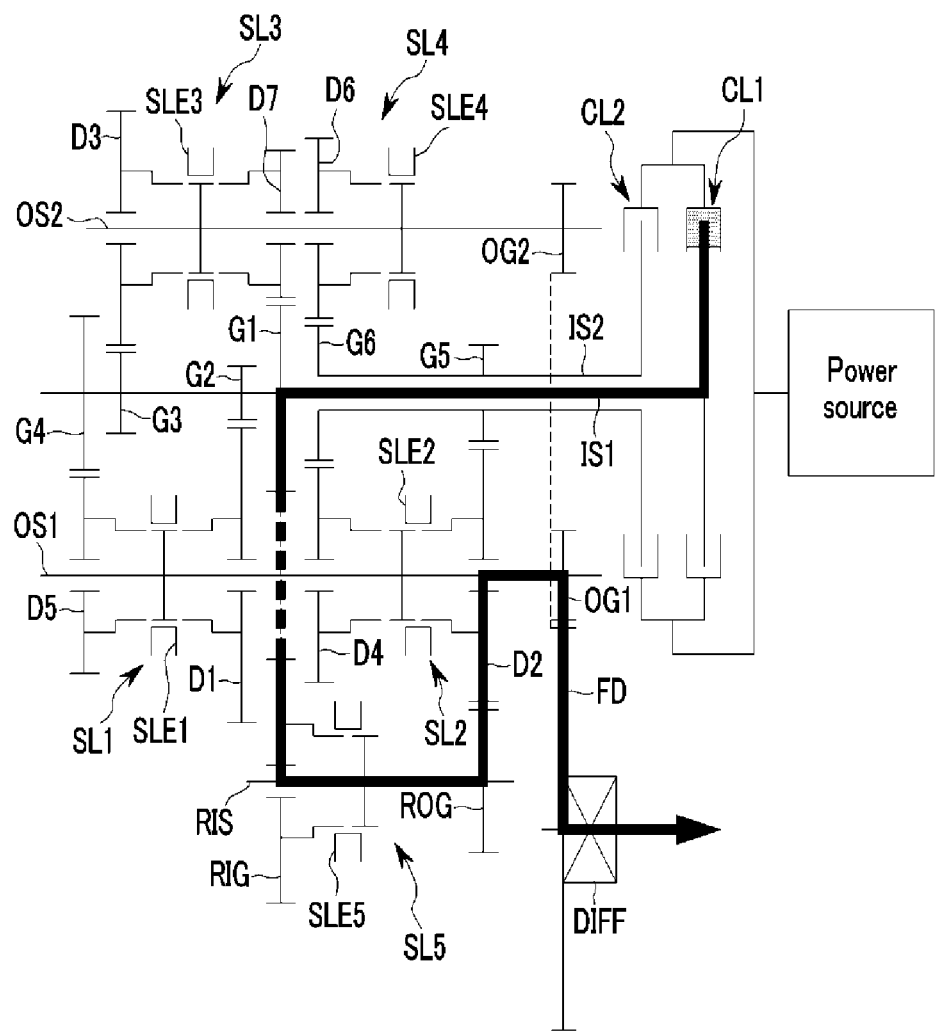
FIG. 6 is a drawing for illustrating flow of power at a reverse speed in a power transmitting apparatus for a vehicle according to the various exemplary embodiments of the present invention.

FIG. 6 is a drawing for illustrating flow of power at a reverse speed in a power transmitting apparatus for a vehicle according to the first exemplary embodiment of the present invention.

Referring to FIG. 5 and FIG. 6, the second speed gear D2 and the first output shaft OS1 are operably connected through the sleeve SEL2 of the second synchronizer SL2 and the reverse input gear RIG and the reverse idle shaft RIS are operably connected through the sleeve SEL5 of the fifth synchronizer SL5 at a reverse speed. After that, when the first clutch CL1 is operated, a shift to the reverse speed is completed.

Therefore, the torque of the power source is transmitted to the final reduction gear FD through the first input shaft IS1, the first input gear G1, the reverse input gear RIG, the reverse idle shaft RIS, the reverse output gear ROG, the second speed gear D2, the first output shaft OS1, and the first output gear OG1. Therefore, the driving wheel is rotated inversely.

Two synchronizers SL1 and SL2 and the first output gear OG1 are disposed on the first output shaft OS1, two synchronizers SL3 and SL4 and the second output gear OG2 are disposed on the second output shaft OS2, and one synchronizer SL5 involved in the reverse speed is disposed on the reverse idle shaft RIS in the power transmitting apparatus according to the first exemplary embodiment of the present invention.

Since the fourth synchronizer SL4 operably connects one speed gear to the second output shaft OS2, the number of components may be reduced and a length may be shortened.

Weight and cost may be reduced due to reduction of the number of components, and mountability may be improved by shortening length of the transmission.

Figure 7:
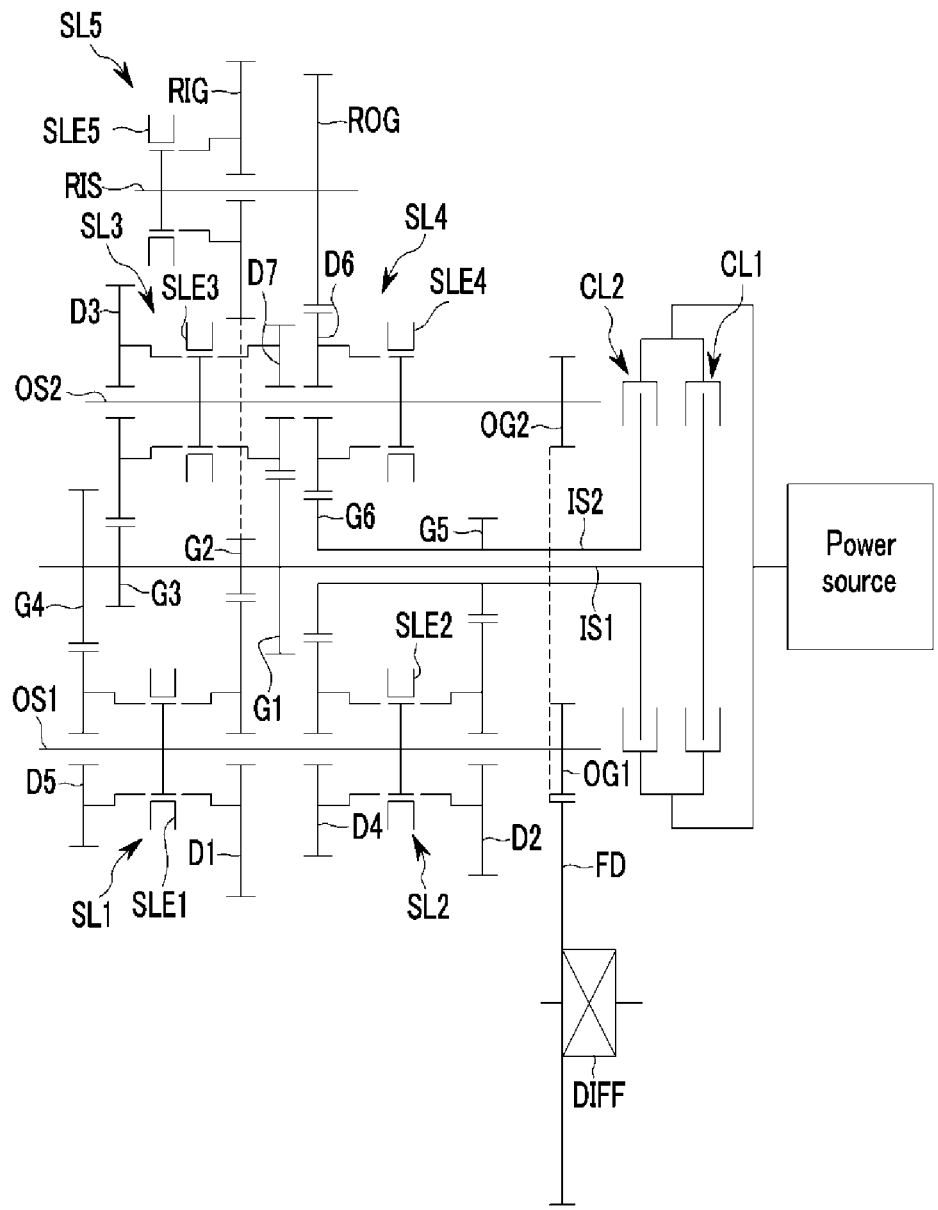
FIG. 7 is a schematic diagram of a power transmitting apparatus for a vehicle according to the various exemplary embodiments of the present invention.

FIG. 7 is a schematic diagram of a power transmitting apparatus for a vehicle according to the second exemplary embodiment of the present invention.

Referring to FIG. 7, a position of the reverse speed device is changed in the power transmitting apparatus according to the second exemplary embodiment of the present invention, compared with the first exemplary embodiment. That is, the reverse speed device is operably connected to the second output shaft OS2 such that the reverse speed is output through the second output shaft OS2.

That is, since the variable connecting device, the input device and the speed output device of the second exemplary embodiment are the same as those of the first exemplary embodiment, detailed description thereof will be omitted.

Compared with the first exemplary embodiment, the reverse idle shaft RIS is disposed in parallel with the second output shaft OS2 in the reverse speed device according to the second exemplary embodiment.

The reverse input gear RIG and the reverse output gear ROG are disposed on the reverse idle shaft RIS. The reverse input gear RIG is rotatable about the reverse idle shaft RIS and the reverse output gear ROG is fixed to the reverse idle shaft RIS.

In addition, the fifth synchronizer SL5 operably connecting the reverse input gear RIG to the reverse idle shaft RIS is disposed on the reverse idle shaft RIS.

At this time, the reverse input gear RIG is engaged with the second input gear G2 on the first input shaft IS1 and the reverse output gear ROG is engaged with the sixth speed gear D6 on the second output shaft OS2.

Figure 8:
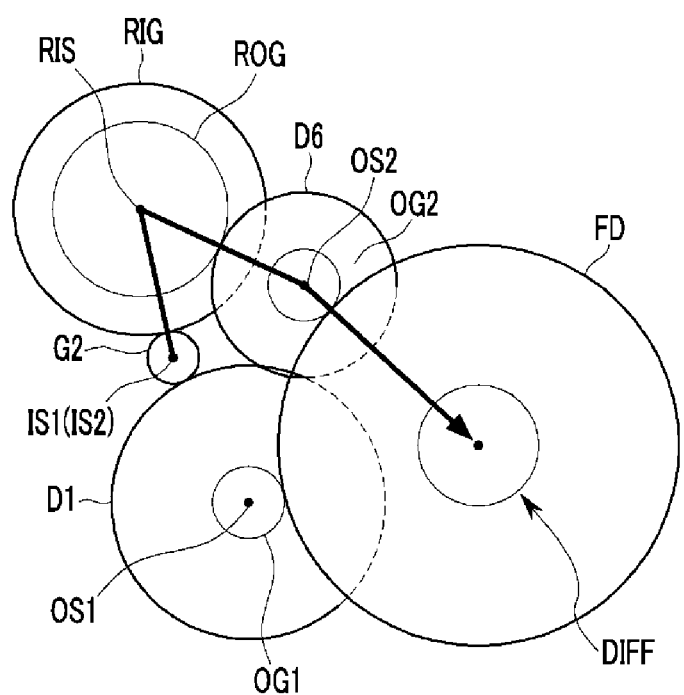
FIG. 8 is an axial plan view of a power transmitting apparatus for a vehicle according to the various exemplary embodiments of the present invention.

FIG. 8 is an axial plan view of a power transmitting apparatus for a vehicle according to the second exemplary embodiment of the present invention.

Referring to FIG. 8, the first input shaft IS1 as well as the second input shaft IS2, the first and second output shafts OS1 and OS2, the reverse idle shaft RIS, and the differential device DIFF are disposed in parallel with each other.

In addition, the second input gear G2 on the first input shaft IS1 is engaged with the first speed gear D1 and the reverse input gear RIG.

The reverse output gear ROG on the reverse idle shaft RIS is engaged with the sixth speed gear D6 on the second output shaft OS2.

In addition, first and second output gears OG1 and OG2 on the first and second output shafts OS1 and OS2 are engaged with the final reduction gear FD of the differential device DIFF.

FIG. 9 is an operational chart of a power transmitting apparatus for a vehicle according to the second exemplary embodiment of the present invention.

Referring to FIG. 9, shifting processes to the first forward speed to the seventh forward speed in the second exemplary embodiment are the same as those in the first exemplary embodiment, but shifting process to the reverse speed is changed.

Therefore, the shifting process to the reverse speed will be described in detail.

Figure 10:
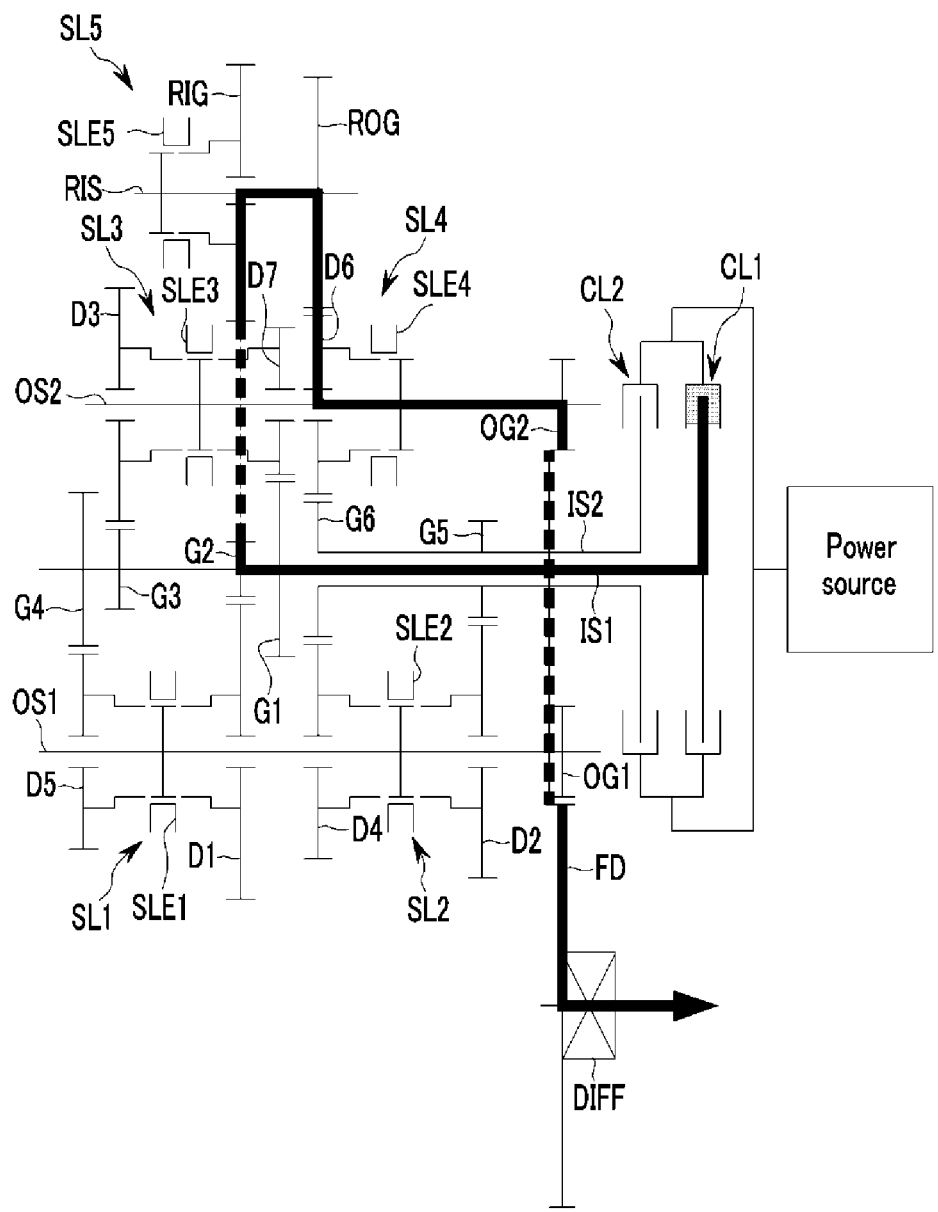
FIG. 10 is a drawing for illustrating flow of power at a reverse speed in a power transmitting apparatus for a vehicle according to the various exemplary embodiments of the present invention.

FIG. 10 is a drawing for illustrating flow of power at a reverse speed in a power transmitting apparatus for a vehicle according to the second exemplary embodiment of the present invention.

Referring to FIG. 9 and FIG. 10, the sixth speed gear D6 and the second output shaft OS2 are operably connected through the sleeve SEL4 of the fourth synchronizer SL4, and the reverse input gear RIG and the reverse idle shaft RIS are operably connected through the sleeve SEL5 of the fifth synchronizer SL5 at the reverse speed. After that, when the first clutch CL1 is operated, a shift to the reverse speed is completed.

Therefore, the torque of the power source is transmitted to the final reduction gear FD through the first input shaft IS1, the second input gear G2, the reverse input gear RIG, the reverse idle shaft RIS, the reverse output gear ROG, the sixth speed gear D6, the second output shaft OS2, and the second output gear OG2. Therefore, the driving wheel is rotated inversely.

Figure 11:
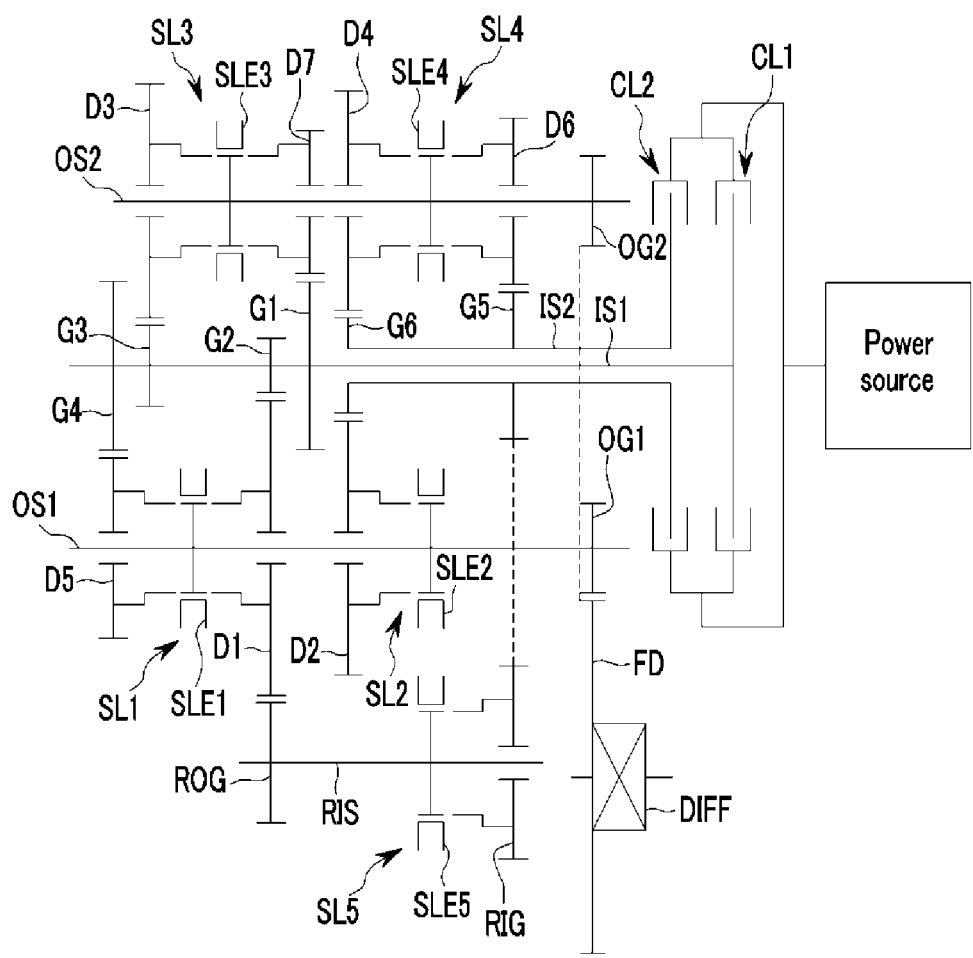
FIG. 11 is a schematic diagram of a power transmitting apparatus for a vehicle according to the various exemplary embodiments of the present invention.

FIG. 11 is a schematic diagram of a power transmitting apparatus for a vehicle according to the third exemplary embodiment of the present invention.

Referring to FIG. 11, the speed output device and the reverse speed device are changed in the power transmitting apparatus according to the third exemplary embodiment of the present invention, compared with the first exemplary embodiment. That is, the reverse speed device is operably connected to the first output shaft OS1 such that the reverse speed is output through the first output shaft OS1.

Since the variable connecting device and the input device of the third exemplary embodiment are the same as those of the first exemplary embodiment, detailed description thereof will be omitted.

Compared with the first exemplary embodiment, the fourth speed gear D4 is disposed on the second output shaft OS2 in the speed output device according to the third exemplary embodiment. That is, the first speed gear D1, the second speed gear D2, and the fifth speed gear D5 are disposed on the first output shaft OS1, and the third speed gear D3, the fourth speed gear D4, the sixth speed gear D6, and the seventh speed gear D7 are disposed on the second output shaft OS2.

At this time, the fourth speed gear D4 and the sixth speed gear D6 have the fourth synchronizer SL4 in common.

In addition, since the fourth speed gear D4 is disposed on the second output shaft OS2, the second speed gear D2 on the first output shaft OS1 has the second synchronizer SL2 solely.

Meanwhile, the reverse speed device includes the reverse idle shaft RIS disposed in parallel with the first output shaft OS1.

The reverse input gear RIG and the reverse output gear ROG are disposed on the reverse idle shaft RIS. The reverse input gear RIG is rotatable about the reverse idle shaft RIS and the reverse output gear ROG is fixed to the reverse idle shaft RIS.

In addition, the fifth synchronizer SL5 operably connecting the reverse input gear RIG to the reverse idle shaft RIS is disposed on the reverse idle shaft RIS.

At this time, the reverse input gear RIG is engaged with the fifth input gear G5 on the second input shaft IS2 and the reverse output gear ROG is engaged with the first speed gear D1 on the first output shaft OS1.

Figure 12:
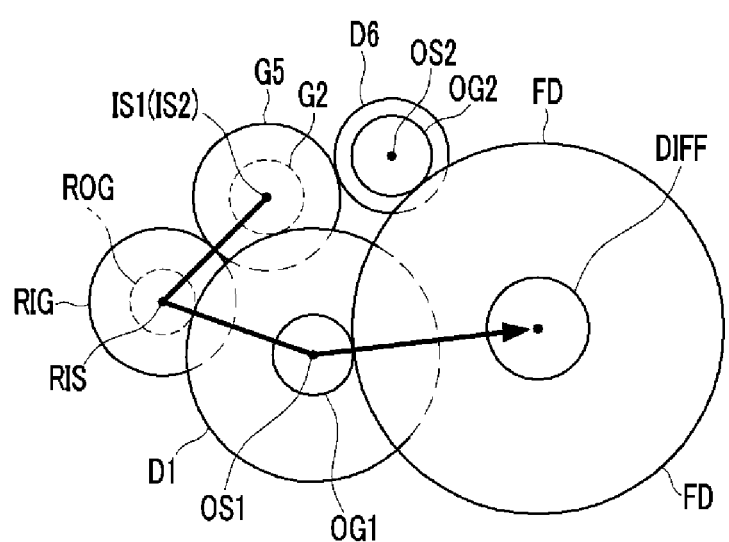
FIG. 12 is an axial plan view of a power transmitting apparatus for a vehicle according to the various exemplary embodiments of the present invention.

FIG. 12 is an axial plan view of a power transmitting apparatus for a vehicle according to the third exemplary embodiment of the present invention.

Referring to FIG. 12, the first input shaft IS1 as well as the second input shaft IS2, the first and second output shafts OS1 and OS2, the reverse idle shaft RIS, and the differential device DIFF are disposed in parallel with each other.

In addition, the fifth input gear G5 on the second input shaft is engaged with the reverse input gear RIG and the sixth speed gear D6 on the second output shaft OS2, and the reverse output gear ROG is engaged with the first speed gear D1 on the first output shaft OS1.

In addition, first and second output gears OG1 and OG2 on the first and second output shafts OS1 and OS2 are engaged with the final reduction gear FD of the differential device DIFF.

FIG. 13 is an operational chart of a power transmitting apparatus for a vehicle according to the third exemplary embodiment of the present invention.

Referring to FIG. 13, shifting processes to the first forward speed to the third forward speed and the fifth forward speed to the seventh forward speed in the third exemplary embodiment are the same as those in the first exemplary embodiment, but shifting process to the fourth forward speed and the reverse speed are changed.

Therefore, the shifting processes to the fourth forward speed and the reverse speed will be described in detail.

Figure 14:
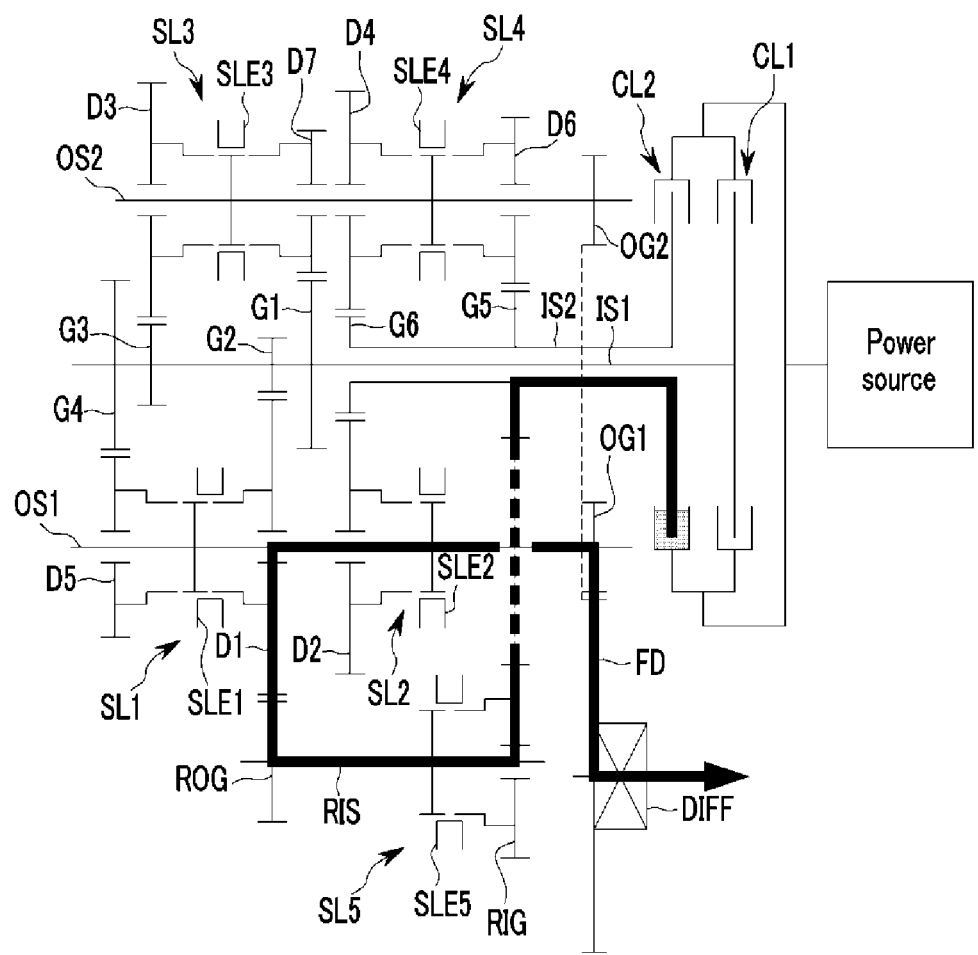
FIG. 14 is a drawing for illustrating flow of power at a reverse speed in a power transmitting apparatus for a vehicle according to the various exemplary embodiments of the present invention.

FIG. 14 is a drawing for illustrating flow of power at a reverse speed in a power transmitting apparatus for a vehicle according to the second exemplary embodiment of the present invention.

Referring to FIG. 13 and FIG. 14, when the vehicle speed increases at the third forward speed 3rd and shift to the fourth forward speed 4th is necessary, the fourth speed gear D4 and the second output shaft OS2 are operably connected through the sleeve SEL4 of the fourth synchronizer SL4. After that, the first clutch CL1 is release and the second clutch CL2 is operated. Then, the shift to the fourth forward speed is completed.

After the shift to the fourth forward speed is completed, the sleeve SEL3 of the third synchronizer SL3 is moved to a neutral position.

In addition, the first speed gear D1 and the first output shaft OS1 are operably connected through the sleeve SEL1 of the first synchronizer SL1 and the reverse input gear RIG and the reverse idle shaft RIS are operably connected through the sleeve SEL5 of the fifth synchronizer SL5 at the reverse speed. After that, when the second clutch CL2 is operated, a shift to the reverse speed is completed.

Therefore, the torque of the power source is transmitted to the final reduction gear FD through the second input shaft IS2, the fifth input gear G5, the reverse input gear RIG, the reverse idle shaft RIS, the reverse output gear ROG, the first speed gear D1, the first output shaft OS1, and the first output gear OG1. Therefore, the driving wheel is rotated inversely.

Figure 15:
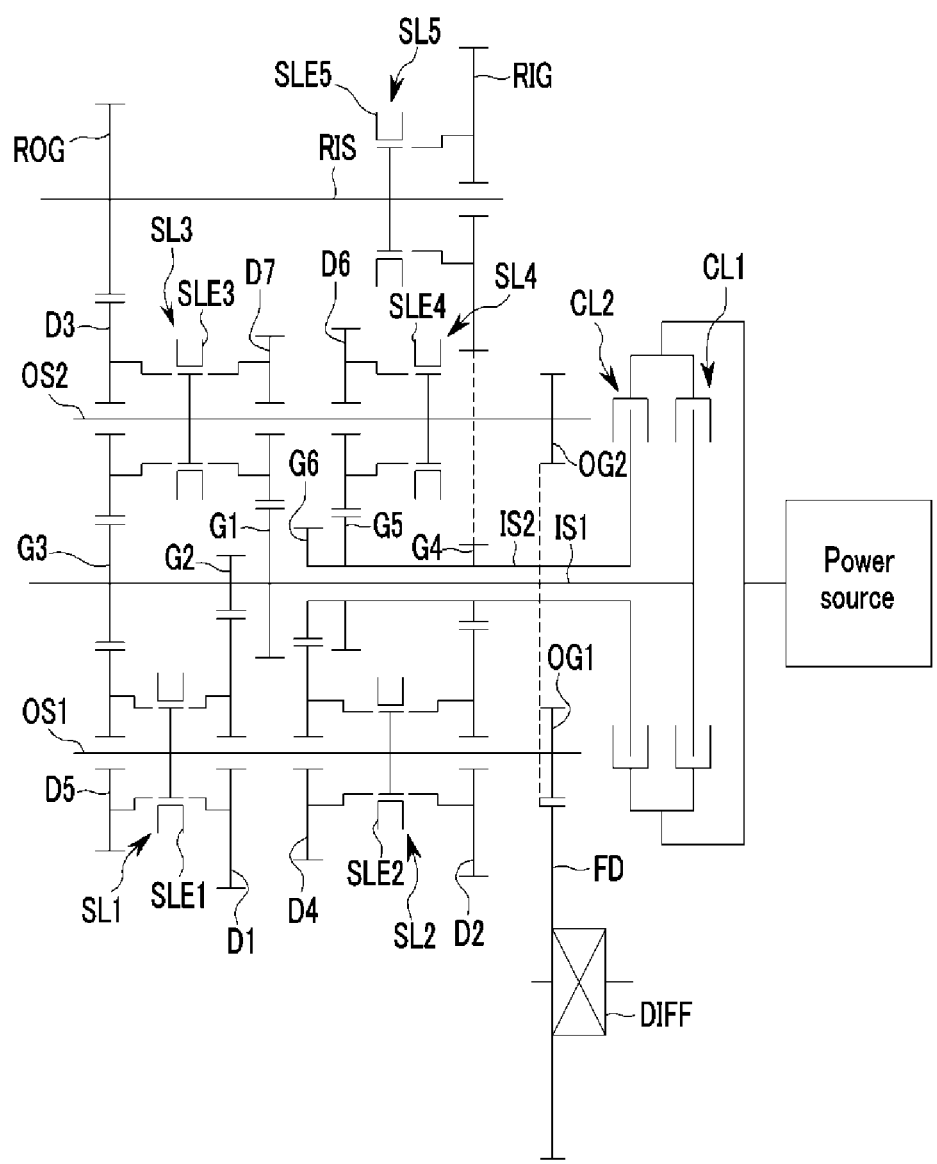
FIG. 15 is a schematic diagram of a power transmitting apparatus for a vehicle according to the various exemplary embodiments of the present invention.

FIG. 15 is a schematic diagram of a power transmitting apparatus for a vehicle according to the fourth exemplary embodiment of the present invention.

Referring to FIG. 15, a position of the reverse speed device is changed in the power transmitting apparatus according to the fourth exemplary embodiment of the present invention, compared with the first exemplary embodiment. That is, the reverse speed device is operably connected to the second output shaft OS2 such that the reverse speed is output through the second output shaft OS2.

In addition, the input device and the speed output device are also changed.

Since the variable connecting device of the fourth exemplary embodiment is the same as that of the first exemplary embodiment, detailed description thereof will be omitted.

According to the fourth exemplary embodiment, the first, second, and third input gears G1, G2, and G3 are disposed on the first input shaft IS1. The first, second, and third input gears G1, G2, and G3 are disposed at the rear portion of the first input shaft IS1 penetrating the second input shaft IS2, and are disposed in a sequence of the first, second, and third input gear G1, G2, and G3.

In addition, the fourth, fifth, and sixth input gears G4, G5, and G6 are disposed on the second input shaft IS2. The fourth, fifth, and sixth input gears G4, G5, and G6 are disposed in a sequence of the fourth, fifth, and sixth input gears G4, G5, and G6.

Therefore, the first, second, and third input gears G1, G2, and G3 as well as the first input shaft IS1 are rotated when the first clutch CL1 is operated, and the fourth, fifth, and sixth input gears G4, G5, and G6 as well as the second input shaft IS2 are rotated when the second clutch CL2 is operated.

The first speed gear D1, the fifth speed gear D5, the first synchronizer SL1, the second speed gear D2, the fourth speed gear D4 and the second synchronizer SL2 disposed on the first output shaft OS1 in the speed output device according to the fourth exemplary embodiment are not changed.

The fifth speed gear D5 is engaged with the third input gear G3 and the second speed gear D2 is engaged with the fourth input gear G4.

The third gear D3, the seventh speed gear D7, the third synchronizer SL3, the sixth speed gear D6 and the fourth synchronizer SL4 disposed on the second output shaft OS2 are not changed in the speed output device according to the fourth exemplary embodiment are not changed.

The sixth speed gear D6 is engaged with the fifth input gear G5.

The reverse speed device includes the reverse idle shaft RIS disposed in parallel with the second output shaft OS2.

The reverse input gear RIG and the reverse output gear ROG are disposed on the reverse idle shaft RIS. The reverse input gear RIG is rotatable about the reverse idle shaft RIS and the reverse output gear ROG is fixed to the reverse idle shaft RIS.

In addition, the fifth synchronizer SL5 operably connecting the reverse input gear RIG to the reverse idle shaft RIS is disposed on the reverse idle shaft RIS.

At this time, the reverse input gear RIG is engaged with the fourth input gear G4 on the second input shaft IS2, and the reverse output gear ROG is engaged with the third speed gear D3 on the second output shaft OS2.

Figure 16:
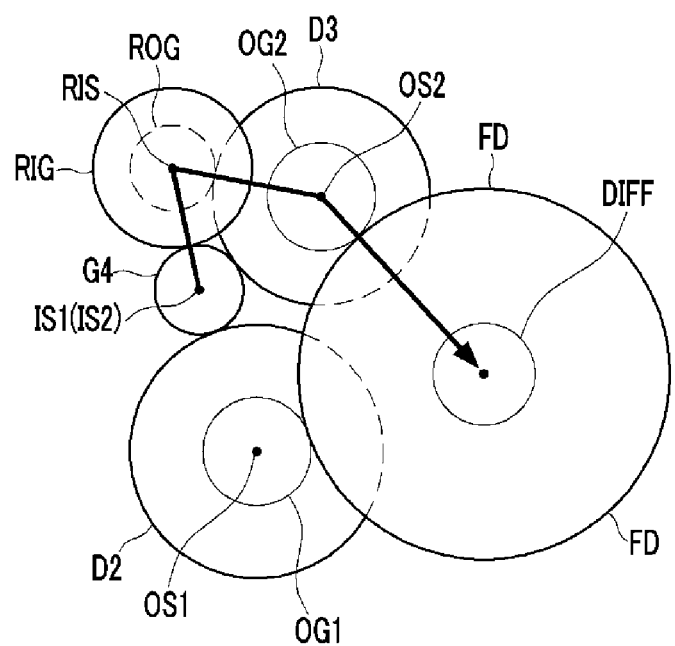
FIG. 16 is an axial plan view of a power transmitting apparatus for a vehicle according to the various exemplary embodiments of the present invention.

FIG. 16 is an axial plan view of a power transmitting apparatus for a vehicle according to the fourth exemplary embodiment of the present invention.

Referring to FIG. 16, the first input shaft IS1 as well as the second input shaft IS2, the first and second output shafts OS1 and OS2, the reverse idle shaft RIS, and the differential device DIFF are disposed in parallel with each other.

In addition, the fourth input gear G4 on the second input shaft IS2 is engaged with the second speed gear D2 and the reverse input gear RIG.

The reverse output gear ROG on the reverse idle shaft RIS is engaged with the third speed gear D3 on the second output shaft OS2.

In addition, first and second output gears OG1 and OG2 on the first and second output shafts OS1 and OS2 are engaged with the final reduction gear FD of the differential device DIFF.

FIG. 17 is an operational chart of a power transmitting apparatus for a vehicle according to the fourth exemplary embodiment of the present invention.

Referring to FIG. 9, shifting processes to the first forward speed to the seventh forward speed in the fourth exemplary embodiment are the same as those in the first exemplary embodiment, but shifting process to the reverse speed is changed.

Therefore, the shifting process to the reverse speed will be described in detail.

Figure 18:
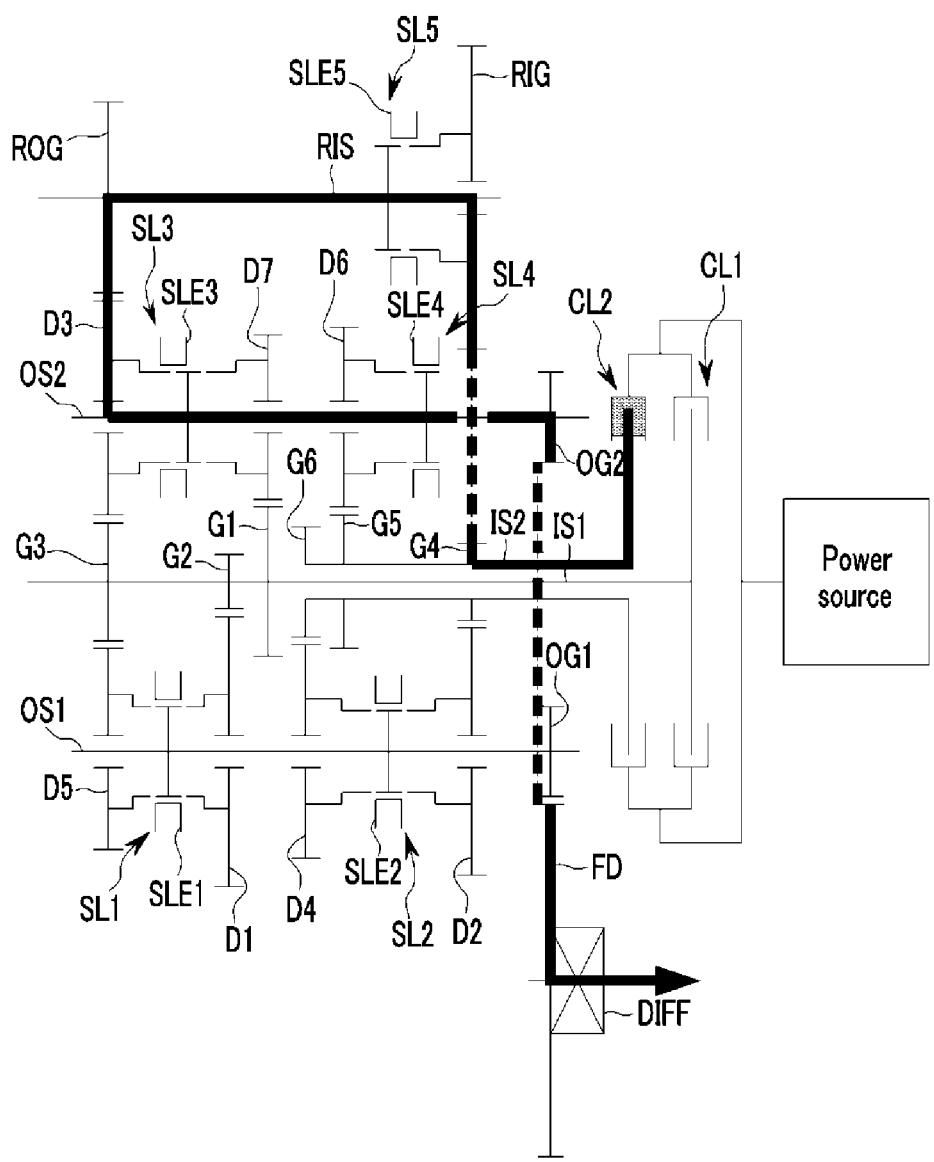
FIG. 18 is a drawing for illustrating flow of power at a reverse speed in a power transmitting apparatus for a vehicle according to the various exemplary embodiments of the present invention.

FIG. 18 is a drawing for illustrating flow of power at a reverse speed in a power transmitting apparatus for a vehicle according to the second exemplary embodiment of the present invention.

Referring to FIG. 17 and FIG. 18, the third speed gear D3 and the second output shaft OS2 are operably connected through the sleeve SEL3 of the third synchronizer SL3, and the reverse input gear RIG and the reverse idle shaft RIS are operably connected through the sleeve SEL5 of the fifth synchronizer SL5. After that, when the second clutch CL2 is operated, a shift to the reverse speed is completed.

Therefore, the torque of the power source is transmitted to the final reduction gear FD through the second input shaft IS2, the fourth input gear G4, the reverse input gear RIG, the reverse idle shaft RIS, the reverse output gear ROG, the third speed gear D3, the second output shaft OS2, and the second output gear OG2. Therefore, the driving wheel is rotated inversely.

Two synchronizers SL1 and SL2 and the first output gear OG1 are disposed on the first output shaft OS1, two synchronizers SL3 and SL4 and the second output gear OG2 are disposed on the second output shaft OS2, and one synchronizer SL5 involved in the reverse speed is disposed on the reverse idle shaft RIS according to the exemplary embodiments of the present invention. In addition, any one synchronizer disposed on the first output shaft or the second output shaft operably connects one speed gear to the first output shaft or the second output shaft. Therefore, the number of components may be reduced and a length may be shortened.

Weight and cost may be reduced due to reduction of the number of components, and mountability may be improved by shortening length of the transmission.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmitting apparatus for a vehicle which selectively transmits torque of a power source to two input shafts through two clutches and outputs changed torque through two output shafts after the torque selectively transmitted to the two input shafts is changed,
wherein each of the two clutches are directly mounted to the two input shafts respectively,
wherein the two input shafts respectively have a plurality of input gears fixed thereon, the two output shafts respectively have a plurality of speed gears rotatable on the output shafts and a plurality of synchronizers operably connecting each speed gear to any one of the output shafts, and each input gear is engaged with at least one speed gear, thereby the torque of power source being transmitted to any one of the two output shafts sequentially through any one of the two input shafts, any one of the plurality of input gears on the any one of the two input shafts, and any one of the plurality of speed gears engaged with the any one of the input gears,
wherein one input gear on one input shaft of the two input shafts is engaged with a reverse input gear on a reverse idle shaft disposed in parallel with the corresponding input shaft, and a reverse output gear on the reverse idle shaft is engaged with one speed gear on one output shaft of the two output shafts, and
wherein at least one of the reverse input gear and the reverse output gear is rotatable about the reverse idle shaft and is operably connected to the reverse idle shaft by at least one synchronizer disposed on the reverse idle shaft.

2. The power transmitting apparatus of claim 1, wherein the two input shafts include:
a first input shaft selectively receiving the torque of the power source through a first clutch of the two clutches; and
a second input shaft being a hollow shaft into which the first input shaft is inserted without rotational interference with the second input shaft and selectively receiving the torque of the power source through a second clutch of the two clutches, and
wherein the two output shafts include first and second output shafts disposed in parallel with the first and second input shafts.

3. The power transmitting apparatus of claim 2,
wherein the first input shaft is provided with first, second, third, and fourth input gears and the second input shaft is provided with fifth and sixth input gears,
wherein the first output shaft is provided with a first speed gear engaged with the second input gear, a fifth speed gear engaged with the fourth input gear, a second speed gear engaged with the fifth input gear, and a fourth speed gear engaged with the sixth input gear,
wherein the second output shaft is provided with a third speed gear engaged with the third input gear, a seventh speed gear engaged with the first input gear, and a sixth speed gear engaged with the sixth input gear, and
wherein the plurality of synchronizers include:
a first synchronizer operably connecting the first speed gear or the fifth speed gear to the first output shaft;
a second synchronizer operably connecting the second speed gear or the fourth speed gear to the first output shaft;
a third synchronizer operably connecting the third speed gear or the seventh speed gear to the second output shaft; and
a fourth synchronizer operably connecting the sixth speed gear to the second output shaft.

4. The power transmitting apparatus of claim 3, wherein the reverse input gear is engaged with the first input gear on the first input shaft and the reverse output gear is engaged with the second speed gear on the first output shaft.

5. The power transmitting apparatus of claim 4, wherein the reverse input gear is rotatable about the reverse idle shaft and the reverse output gear is fixed to the reverse idle shaft.

6. The power transmitting apparatus of claim 4, wherein the reverse input gear is fixed to the reverse idle shaft and the reverse output gear is rotatable about the reverse idle shaft.

7. The power transmitting apparatus of claim 4, wherein the reverse input gear and the reverse output gear are rotatable about the reverse idle shaft.

8. The power transmitting apparatus of claim 3, wherein the reverse input gear is engaged with the second input gear on the first input shaft and the reverse output gear is engaged with the sixth speed gear on the second output shaft.

9. The power transmitting apparatus of claim 8, wherein the reverse input gear is rotatable about the reverse idle shaft and the reverse output gear is fixed to the reverse idle shaft.

10. The power transmitting apparatus of claim 2,
wherein the first input shaft is provided with first, second, third, and fourth input gears and the second input shaft is provided with fifth and sixth input gears,
wherein the first output shaft is provided with a first speed gear engaged with the second input gear, a fifth speed gear engaged with the fourth input gear, and a second speed gear engaged with the sixth input gear,
wherein the second output shaft is provided with a third speed gear engaged with the third input gear, a seventh speed gear engaged with the first input gear, a fourth speed gear engaged with the sixth input gear, and a sixth speed gear engaged with the fifth input gear, and
wherein the plurality of synchronizers include:
a first synchronizer operably connecting the first speed gear or the fifth speed gear to the first output shaft;
a second synchronizer operably connecting the second speed gear to the first output shaft;
a third synchronizer operably connecting the third speed gear or the seventh speed gear to the second output shaft; and
a fourth synchronizer operably connecting the fourth speed gear or the sixth speed gear to the second output shaft.

11. The power transmitting apparatus of claim 10, wherein the reverse input gear is engaged with the fifth input gear on the second input shaft and the reverse output gear is engaged with the first speed gear on the first output shaft.

12. The power transmitting apparatus of claim 11, wherein the reverse input gear is rotatable about the reverse idle shaft and the reverse output gear is fixed to the reverse idle shaft.

13. The power transmitting apparatus of claim 2,
wherein the first input shaft is provide with first, second, and third input gears and the second input shaft is provided with fourth, fifth, and sixth input gears,
wherein the first output shaft is provided with a first speed gear engaged with the second input gear, a fifth speed gear engaged with the third input gear, a fourth speed gear engaged with the sixth input gear, and a second speed gear engaged with the fourth input gear,
wherein the second output shaft is provided with a third speed gear engaged with the third input gear, a seventh speed gear engaged with the first input gear, and a sixth speed gear engaged with the fifth input gear, and
wherein the plurality of synchronizers include:
 a first synchronizer operably connecting the first speed gear or the fifth speed gear to the first output shaft;
 a second synchronizer operably connecting the second speed gear or the fourth speed gear to the first output shaft;
 a third synchronizer operably connecting the third speed gear or the seventh speed gear to the second output shaft; and
 a fourth synchronizer operably connecting the sixth speed gear to the second output shaft.

14. The power transmitting apparatus of claim 13, wherein the reverse input gear is engaged with the fourth input gear on the second input shaft and the reverse output gear is engaged with the third speed gear on the second output shaft.

15. The power transmitting apparatus of claim 14, wherein the reverse input gear is rotatable about the reverse idle shaft and the reverse output gear is fixed to the reverse idle shaft.

16. A power transmitting apparatus for a vehicle comprising:
 a first clutch connected to a power source and selectively outputting torque of the power source;
 a second clutch connected to the power source and selectively outputting the torque of the power source;
 a first input shaft selectively receiving the torque of the power source through the first clutch and provided with first, second, third, and fourth input gears disposed on an exterior circumference thereof;
 a second input shaft disposed on the same axis as the first input shaft without rotational interference, selectively receiving the torque of the power source through the second clutch, and provided with fifth and sixth input gears disposed on an exterior circumference thereof;
 first and second output shafts disposed in parallel with the first and second input shafts;
 a reverse speed device including a reverse idle shaft disposed in parallel with the first and second output shafts, a reverse input gear rotatable about the reverse idle shaft, and a reverse output gear fixed to the reverse idle shaft;
 a first speed gear disposed on the first output shaft, selectively connected to the first output shaft through a first synchronizer, and engaged with the second input gear;
 a fifth speed gear disposed on the first output shaft, selectively connected to the first output shaft through the first synchronizer, and engaged with the fourth input gear;
 a second speed gear disposed on the first output shaft, selectively connected to the first output shaft through a second synchronizer, and engaged with the fifth input gear;
 a fourth speed gear disposed on the first output shaft, selectively connected to the first output shaft through the second synchronizer, and engaged with the sixth input gear;
 a third speed gear disposed on the second output shaft, selectively connected to the second output shaft through a third synchronizer, and engaged with the third input gear;
 a seventh speed gear disposed on the second output shaft, selectively connected to the second output shaft through the third synchronizer, and engaged with the first input gear; and
 a sixth speed gear disposed on the second output shaft, selectively connected to the second output shaft through a fourth synchronizer, and engaged with the sixth input gear,
 wherein the reverse input gear is engaged with the first input gear and is selectively connected to the reverse idle shaft through a fifth synchronizer, and the reverse output gear is engaged with the second speed gear.

17. A power transmitting apparatus for a vehicle comprising:
 a first clutch connected to a power source and selectively outputting torque of the power source;
 a second clutch connected to the power source and selectively outputting the torque of the power source;
 a first input shaft selectively receiving the torque of the power source through the first clutch and provided with first, second, third, and fourth input gears disposed on an exterior circumference thereof;
 a second input shaft disposed on the same axis as the first input shaft without rotational interference, selectively receiving the torque of the power source through the second clutch, and provided with fifth and sixth input gears disposed on an exterior circumference thereof;
 first and second output shafts disposed in parallel with the first and second input shafts;
 a reverse speed device including a reverse idle shaft disposed in parallel with the first and second output shafts, a reverse input gear rotatable about the reverse idle shaft, and a reverse output gear fixed to the reverse idle shaft;
 a first speed gear disposed on the first output shaft, selectively connected to the first output shaft through a first synchronizer, and engaged with the second input gear;
 a fifth speed gear disposed on the first output shaft, selectively connected to the first output shaft through the first synchronizer, and engaged with the fourth input gear;
 a second speed gear disposed on the first output shaft, selectively connected to the first output shaft through a second synchronizer, and engaged with the fifth input gear;
 a fourth speed gear disposed on the first output shaft, selectively connected to the first output shaft through the second synchronizer, and engaged with the sixth input gear;
 a third speed gear disposed on the second output shaft, selectively connected to the second output shaft through a third synchronizer, and engaged with the third input gear;
 a seventh speed gear disposed on the second output shaft, selectively connected to the second output shaft through the third synchronizer, and engaged with the first input gear; and
 a sixth speed gear disposed on the second output shaft, selectively connected to the second output shaft through a fourth synchronizer, and engaged with the sixth input gear, wherein the reverse input gear is engaged with the second input gear and is selectively connected to the reverse idle shaft through a fifth synchronizer, and the reverse output gear is engaged with the sixth speed gear.

18. A power transmitting apparatus for a vehicle comprising:
- a first clutch connected to a power source and selectively outputting torque of the power source;
- a second clutch connected to the power source and selectively outputting the torque of the power source;
- a first input shaft selectively receiving the torque of the power source through the first clutch and provided with first, second, third, and fourth input gears disposed on an exterior circumference thereof;
- a second input shaft disposed on the same axis as the first input shaft without rotational interference, selectively receiving the torque of the power source through the second clutch, and provided with fifth and sixth input gears disposed on an exterior circumference thereof;
- first and second output shafts disposed in parallel with the first and second input shafts;
- a reverse speed device including a reverse idle shaft disposed in parallel with the first and second output shafts, a reverse input gear rotatable about the reverse idle shaft, and a reverse output gear fixed to the reverse idle shaft;
- a first speed gear disposed on the first output shaft, selectively connected to the first output shaft through a first synchronizer, and engaged with the second input gear;
- a fifth speed gear disposed on the first output shaft, selectively connected to the first output shaft through the first synchronizer, and engaged with the fourth input gear;
- a second speed gear disposed on the first output shaft, selectively connected to the first output shaft through a second synchronizer, and engaged with the sixth input gear;
- a third speed gear disposed on the second output shaft, selectively connected to the second output shaft through a third synchronizer, and engaged with the third input gear;
- a seventh speed gear disposed on the second output shaft, selectively connected to the second output shaft through the third synchronizer, and engaged with the first input gear;
- a fourth speed gear disposed on the second output shaft, selectively connected to the second output shaft through a fourth synchronizer, and engaged with the sixth input gear; and
- a sixth speed gear disposed on the second output shaft, selectively connected to the second output shaft through the fourth synchronizer, and engaged with the fifth input gear,
wherein the reverse input gear is engaged with the fifth input gear and is selectively connected to the reverse idle shaft through a fifth synchronizer, and the reverse output gear is engaged with the first speed gear.

19. A power transmitting apparatus for a vehicle comprising:
- a first clutch connected to a power source and selectively outputting torque of the power source;
- a second clutch connected to the power source and selectively outputting the torque of the power source;
- a first input shaft selectively receiving the torque of the power source through the first clutch and provided with first, second, and third input gears disposed on an exterior circumference thereof;
- a second input shaft disposed on the same axis as the first input shaft without rotational interference, selectively receiving the torque of the power source through the second clutch, and provided with fourth, fifth, and sixth input gears disposed on an exterior circumference thereof;
- first and second output shafts disposed in parallel with the first and second input shafts;
- a reverse speed device including a reverse idle shaft disposed in parallel with the first and second output shafts, a reverse input gear rotatable about the reverse idle shaft, and a reverse output gear fixed to the reverse idle shaft;
- a first speed gear disposed on the first output shaft, selectively connected to the first output shaft through a first synchronizer, and engaged with the second input gear;
- a fifth speed gear disposed on the first output shaft, selectively connected to the first output shaft through the first synchronizer, and engaged with the third input gear;
- a second speed gear disposed on the first output shaft, selectively connected to the first output shaft through a second synchronizer, and engaged with the fourth input gear;
- a fourth speed gear disposed on the first output shaft, selectively connected to the first output shaft through the second synchronizer, and engaged with the sixth input gear;
- a third speed gear disposed on the second output shaft, selectively connected to the second output shaft through a third synchronizer, and engaged with the third input gear;
- a seventh speed gear disposed on the second output shaft, selectively connected to the second output shaft through the third synchronizer, and engaged with the first input gear; and
- a sixth speed gear disposed on the second output shaft, selectively connected to the second output shaft through a fourth synchronizer, and engaged with the fifth input gear,
wherein the reverse input gear is engaged with the fourth input gear and is selectively connected to the reverse idle shaft through a fifth synchronizer, and the reverse output gear is engaged with the third speed gear.

* * * * *